US006920381B2

(12) United States Patent
Doherty et al.

(10) Patent No.: US 6,920,381 B2
(45) Date of Patent: Jul. 19, 2005

(54) NETWORK CAR ANALYZER

(75) Inventors: James M. Doherty, Georgetown, TX (US); Thomas Lee Adams, Austin, TX (US)

(73) Assignee: SBC Properties, LP, Reno, NV (US)

( * ) Notice: Subject to any disclaimer, the term of this patent is extended or adjusted under 35 U.S.C. 154(b) by 89 days.

(21) Appl. No.: 10/249,820

(22) Filed: May 9, 2003

(65) Prior Publication Data

US 2004/0225422 A1 Nov. 11, 2004

(51) Int. Cl.[7] ............................................. G01M 17/00
(52) U.S. Cl. ............................. 701/33; 701/29; 701/32
(58) Field of Search ............................. 701/24, 25, 29, 701/33, 30, 34, 35; 73/116, 117.2; 705/1, 16

(56) References Cited

U.S. PATENT DOCUMENTS 6,526,335 B1 * 2/2003 Treyz et al. .................. 701/1
6,711,474 B1 * 3/2004 Treyz et al. .................. 701/1
6,732,031 B1 * 5/2004 Lightner et al. ............. 701/33
6,735,503 B2 * 5/2004 Ames ......................... 701/29
6,745,151 B2 * 6/2004 Marko et al. ............... 702/182

* cited by examiner

*Primary Examiner*—Richard M. Camby
(74) *Attorney, Agent, or Firm*—Lacasse & Associates, LLC; Randy W. Lacasse; Ramraj Soundararajan

(57) ABSTRACT

An automobile's maintenance port is wirelessly connected (for example, via an IEEE 802.11-based connection) to a plurality of gateways/routers that forward automobile diagnostic data (such as a series of diagnostic codes) to a network analyzer server. The network analyzer server offers subscribers a service providing analysis of the received diagnostic data, wherein such analyzed information is transmitted to one or more predetermined locations (such as to a personal computer of the subscriber or a mechanic's diagnostic device at a service station). Thus, homeowners and garages receive the same data and the system eliminates the need for garages to purchase expensive engine analyzers.

18 Claims, 4 Drawing Sheets

NETWORK CAR ANALYZER

BACKGROUND OF INVENTION

1. Field of the Invention

The present invention relates generally to the field of wireless transmissions. More specifically, the present invention is related to wireless transmissions of vehicle diagnostic data.

2. Discussion of Prior Art

An On-Board Diagnostic, or OBD, system is a computer-based system that was developed by automobile manufacturers to monitor the performance of various components of an automobile's engine, including emission controls. Upon detection of any malfunction, the OBD system provides the owner of the automobile with an early warning (e.g., check engine light in the dashboard of an automobile). OBD was primarily introduced to meet EPA emission standards but, through the years, on-board diagnostic systems have become more sophisticated. For example, OBD-II, a standard introduced in the mid-90's and implemented in light-duty cars and trucks, provides a plurality of sensors to monitor malfunctions with engine, chassis, body, and accessory devices.

In a simple scenario, the OBD system detects a malfunction in the engine (or any other component that is monitored by sensors of the OBD system) and signals a warning indicative of such a malfunction. For example, a "check engine" light could be illuminated in an automobile's dashboard indicative of such a malfunction. The automobile's owner, upon noticing such a warning indicator, makes plans for taking the automobile to a service station where the malfunction can be further investigated. Upon arrival at the service station, repair personnel connect a cable that serves as a communication link between the automobile's diagnostic port and a computing device (such as a laptop). Next, the computing device decodes OBD-II system signals (such as diagnostic codes received via the diagnostic port) and presents them to the service station personnel, who then make a decision on how to fix the malfunction.

However, the disadvantage in such a scenario is that the automobile's owner is unaware of the precise nature of the malfunction. For example, the automobile's owner is at a disadvantage in making decisions, such as whether or not to take the automobile to the service station immediately or if it is acceptable to take the automobile at a later time that is more convenient to the automobile's owner. Furthermore, the automobile's owner is also at a disadvantage in not knowing if the repair personnel at the service station are dependable to work on and bill him/her for only the services that were warranted (i.e., warranted based on data received from the automobile's diagnostic port). Thus, the automobile's owner is unaware if the service station over-charges him/her for services that were not required.

Another disadvantage with such a scenario is the need for significant investment by service stations for purchasing scanning equipment that is able to dock with an automobile's maintenance port to diagnose problems using a system such as the OBD II system.

The following references provide a general teaching in the area of vehicle diagnostics, but they fail to provide for the system or method of the claimed invention.

The U.S. Pat. No. to Ng (5,445,347) provides for an automated wireless preventive maintenance monitoring system for magnetic levitation trains and other vehicles. Disclosed are sensors for monitoring the operational status or conditions of cars of a train. The maintenance control center generates a prognosis of the operating conditions of the cars, in accordance with the data signals received from the cars, and schedules maintenance actions based on the prognosis.

The U.S. patent to Godau et al. U.S. Pat. No. (5,781,125) provides for an arrangement for the wireless exchange of data between a servicing device and a control unit in a motor vehicle. Disclosed is a radio or infrared transmitting and receiving unit that is part of a radio or infrared transmission path to a servicing device.

The patent to Arjomand (5,884,202) provides for a modular wireless diagnostic test and information system. Disclosed is a computer-based apparatus providing access to complex technical information used to maintain and repair a motor vehicle.

The patent to Schmitt (5,912,941) provides for a communication system for use in diagnosis of an apparatus. Disclosed is a diagnostic procedure enabled at the location of an apparatus (e.g., medical apparatus) by providing a transmitter that wirelessly communicates with a central station.

The patent to Colson et al. (6,181,994 B1) provides for a method and system for vehicle initiated delivery of advanced diagnostics based on the determined need by vehicle. Network vehicles communicate with diagnostic centers over a link such as cellular or wireless.

The patent to Moskowitz et al. (6,339,736 B1) provides for a system and method for the distribution of automotive services. Disclosed is an in-vehicle electronic system comprising an in-vehicle computing system having diagnostics capability. The diagnostic data is transmitted to a remote service center via a communication link.

The patent application publication to Petite (2002/0019725 A1) provides for wireless communication networks for providing remote monitoring, via sensors, of devices on a network.

Whatever the precise merits, features, and advantages of the above-cited references, none of them achieves or fulfills the purposes of the present invention. Thus, what is needed is an economical and user-friendly means for scanning and diagnosing ODB II system codes.

Additionally, what is needed is a system that provides both automobile users and service station personnel with engine diagnosis data. The present invention's system and method overcome the above-mentioned disadvantages by providing for a network car analyzer that is able to receive automobile diagnostic codes from a plurality of gateways (physically dispersed at pre-determined locations) over a network wherein each of the gateways is able to wirelessly receive, via a protocol such as IEEE 802.11, diagnostic codes from an automobile's diagnostic port. A brief description of various IEEE 802.11 protocols is provided below.

802.11 refers to a family of specifications developed by the Institute of Electrical and Electronics Engineers (IEEE) for wireless local area network (LAN) technology. 802.11 specifies an over-the-air interface between a wireless client and a base station or between two wireless clients. There are several specifications in the 802.11 family, some of which are described below:

Â. 802.11 applies to wireless LANs providing 1 or 2 Mbps transmission in the 2.4 band using either frequency hopping spread spectrum (FHSS) or direct sequence spread spectrum (DSSS).

Â. 802.11a an extension to 802.11 that applies to wireless local area networks (LANs) and provides up to 54 Mbps in the 5 GHz band. 802.11a uses an orthogonal frequency division multiplexing encoding scheme rather than FHSS or DSSS.

Â. 802.11b also referred to as 802.11 High Rate or Wi-Fi (for wireless fidelity), formed as a ratification to the original 802.11 standard, allows wireless functionality comparable to the Ethernet. This is an extension to 802.11, which applies to wireless LANs and provides 11 Mbps transmission (with fallback to 5.5, 2, and 1 Mbps) in the 2.4 GHz band. Transmission in the 802.11b standard is accomplished via DSSS.

Â. 802.11g applies to wireless LANs and provides 20+ Mbps in the 2.4 GHz band.

The most popular of the above standards is the 802.11b.

SUMMARY OF THE INVENTION

The present invention provides for a system offering one or more subscribers network-based automobile diagnostic services, wherein the system comprises a plurality of gateways dispersed at predetermined physical locations and one or more network analyzer server(s) capable of receiving said forwarded automobile diagnostic data. Each of the gateways is capable of establishing a wireless communication link with at least one automobile diagnostic port for wirelessly receiving and forwarding automobile diagnostic data, wherein the automobile diagnostic data comprises a set of automobile diagnostic codes in conformity with a diagnostic standard. The network analyzer server(s) analyzes said forwarded automobile diagnostic data and provides feedback regarding conditions that require immediate attention.

The present invention also provides for a method for analyzing automobile diagnostic data, wherein the method comprises the steps of: (a) receiving, over a network (such as a LAN, WAN, or the Internet), vehicle diagnostic data from a gateway located at a predefined location, wherein the gateway wirelessly receives the vehicle diagnostic data from an automobile; (b) analyzing the received vehicle diagnostic data and identifying instances that require attention; and (c) forwarding said identified instances to one or more subscriber-defined locations, wherein the identified instances are utilized at said one or more subscriber-defined locations to diagnose vehicle-related malfunctions.

In one embodiment, wireless communications between an automobile and any of the above-mentioned gateways are via an 802.11-based protocol. In yet another embodiment, the transmitted diagnostic data is a series of diagnostic codes compliant with the ODB II standard.

The present invention's service can be offered as an analysis service to homeowners and the public for use from a server on a network, such as a local area network (LAN), wide area network (WAN), or the Internet. This service allows garages and homeowners access to the same data, thereby making it unnecessary for garages to buy expensive engine analyzers.

DESCRIPTION OF THE PREFERRED EMBODIMENTS

Figure 1:
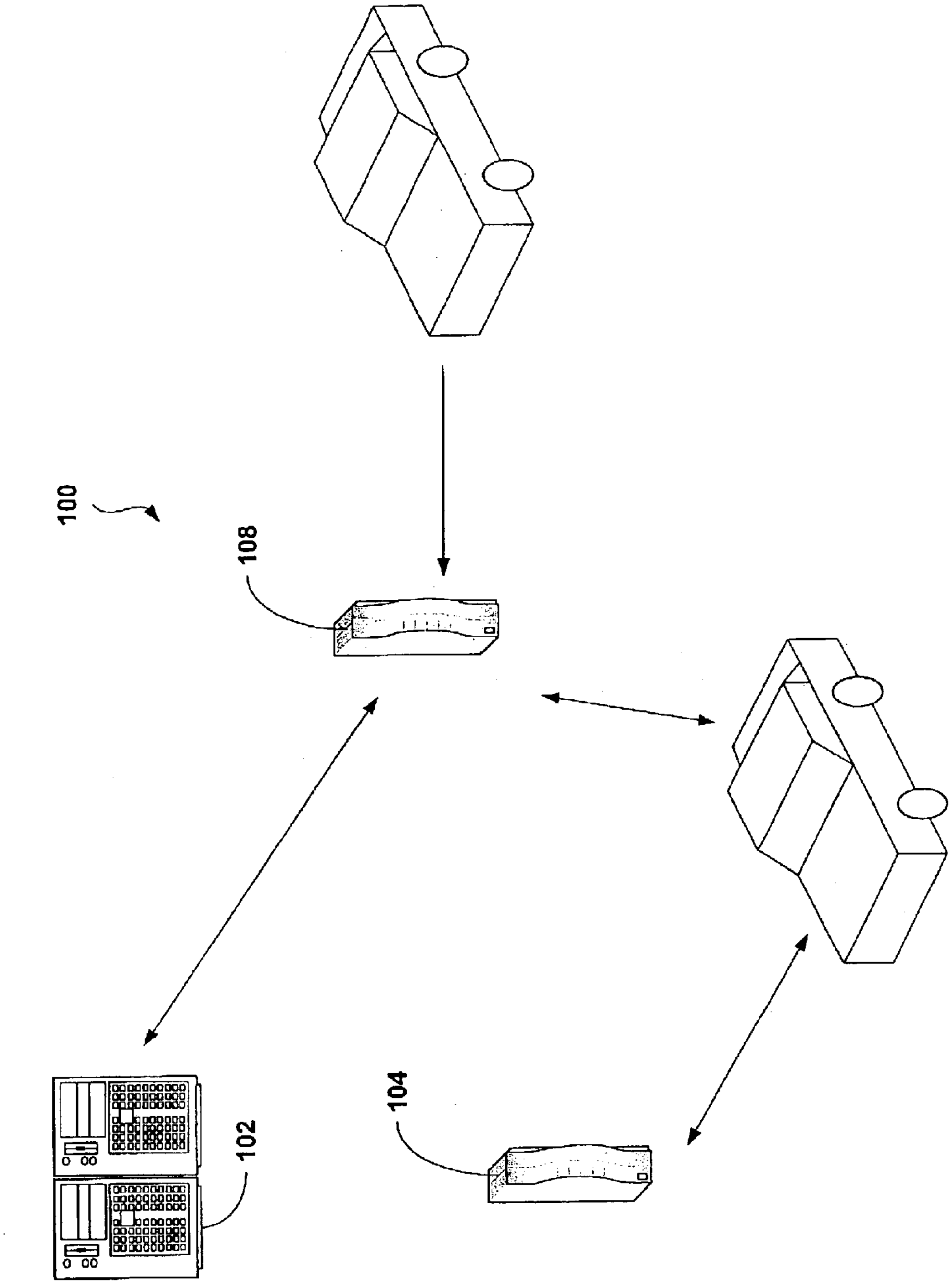
FIG. 1 illustrates an overview of a system associated with the present invention's network car analyzer.

While this invention is illustrated and described in a preferred embodiment, the invention may be produced in many different configurations. There is depicted in the drawings, and will herein be described in detail, a preferred embodiment of the invention, with the understanding that the present disclosure is to be considered an exemplification of the principles of the invention and the associated functional specifications for its construction and is not intended to limit the invention to the embodiment illustrated. Those skilled in the art will envision many other possible variations within the scope of the present invention.

FIG. 1 illustrates an overview of system 100 associated with the present invention's network car analyzer. System 100 comprises a network analyzer server 102 able to communicate, via a network (such as a local area network, a wide area network, or the Internet), with a plurality of gateways/routers 104, 108 located at various pre-determined physical locations.

Figure 2:
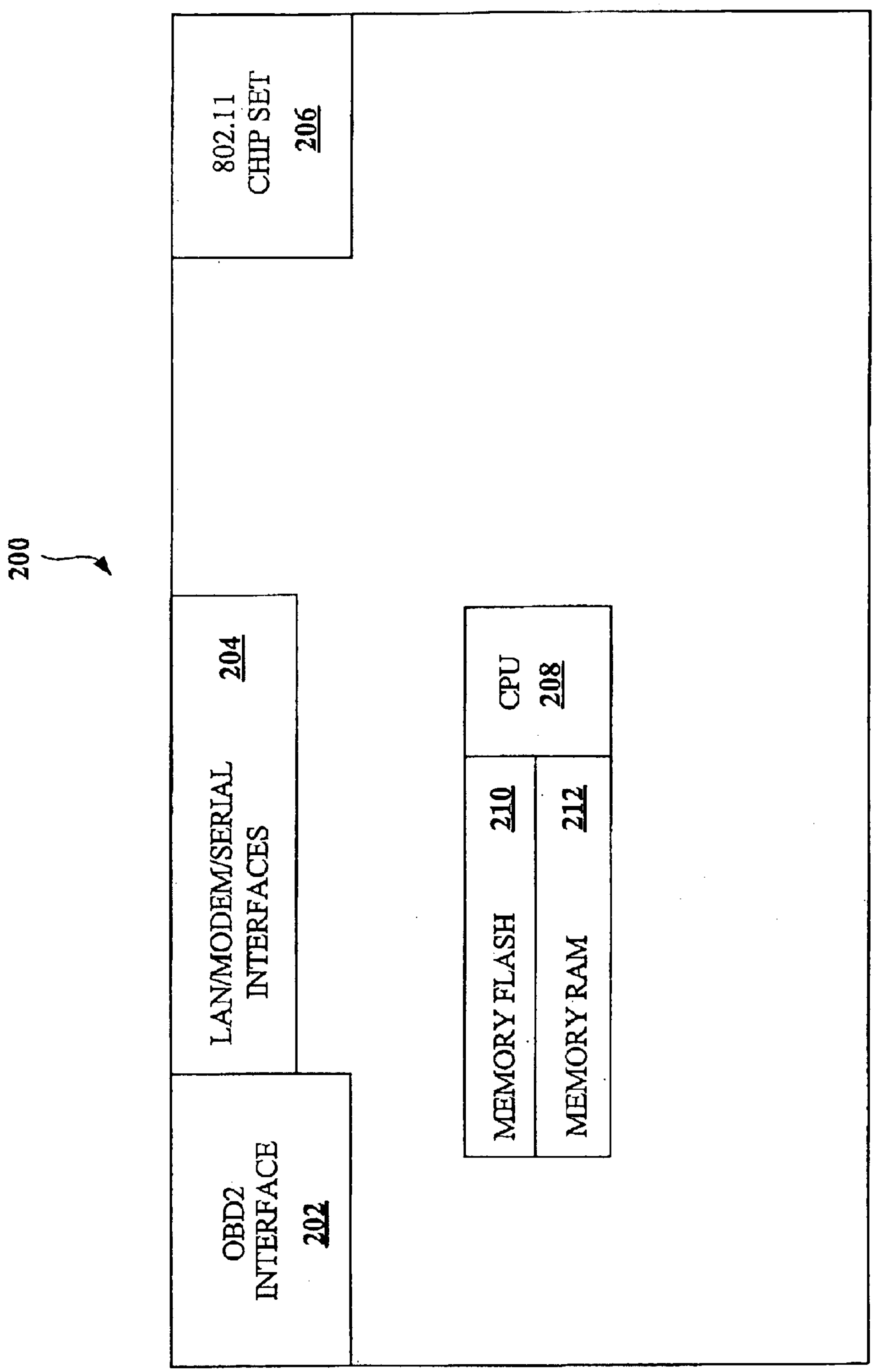
FIG. 2 illustrates an example of a wireless transmitter device that uses a single board computer running a real-time operating system (RTOS) like embedded Linux™.

Based upon the present invention, a subscriber of network analyzing services drives an automobile to one of the gateway/routers 104, 108 and physically attaches a wireless transmitter device to an automobile's diagnostic port, wherein the device is capable of receiving diagnostic data and formatting the received diagnostic data for wireless transmission via gateways/routers 104, 108. In the preferred embodiment, the diagnostic data comprises a series of diagnostic codes compliant with the ODB II standard. FIG. 2 illustrates an example of a wireless transmitter device that uses a single board computer 200 running a real-time operating system (RTOS) like embedded Linux™. The single board computer 200 comprises a plurality of interfaces (e.g., OBD2 interface 202 and LAN/modem/serial interface 204), an 802.11 chipset 206 for facilitating wireless communication, and a processor 208 operatively linked with memory modules (e.g., flash memory 210 or RAM memory It should be noted that, for discussion purposes, although a wireless transmitter device is described as being physically attached to the automobile's diagnostic port, other variations are envisioned, including one wherein the automobile's diagnostic port is modified to permanently attach the wireless transmitter device that can be activated either manually or automatically to wirelessly transmit diagnostic data to the network analyzer server via the gateways/routers at various physical locations.

Network analyzer server 102 is a server capable of receiving the forwarded automobile diagnostic data, wherein the server analyzes the forwarded automobile diagnostic data and provides feedback regarding conditions that require attention. The network analyzer server 102 forwards the diagnostic data to appropriate locations (such locations can be preset by subscribers, i.e., such as a mechanic's diagnostic computing device, hot-spots where such information could be forwarded (e.g., diagnostic data can be forwarded to a plurality of hot-spots located on Interstates and other roadways), a subscriber's personal computer, etc.). However, it should be noted that the location where such analyzed data is received should not be used to limit the scope of the present invention. It should be noted that although the network analyzer server 102 is shown as a singular entity, other scenarios falling within the scope of the present invention are envisioned, including embodiments wherein more than one network analyzer servers are connected across networks.

Figure 3:
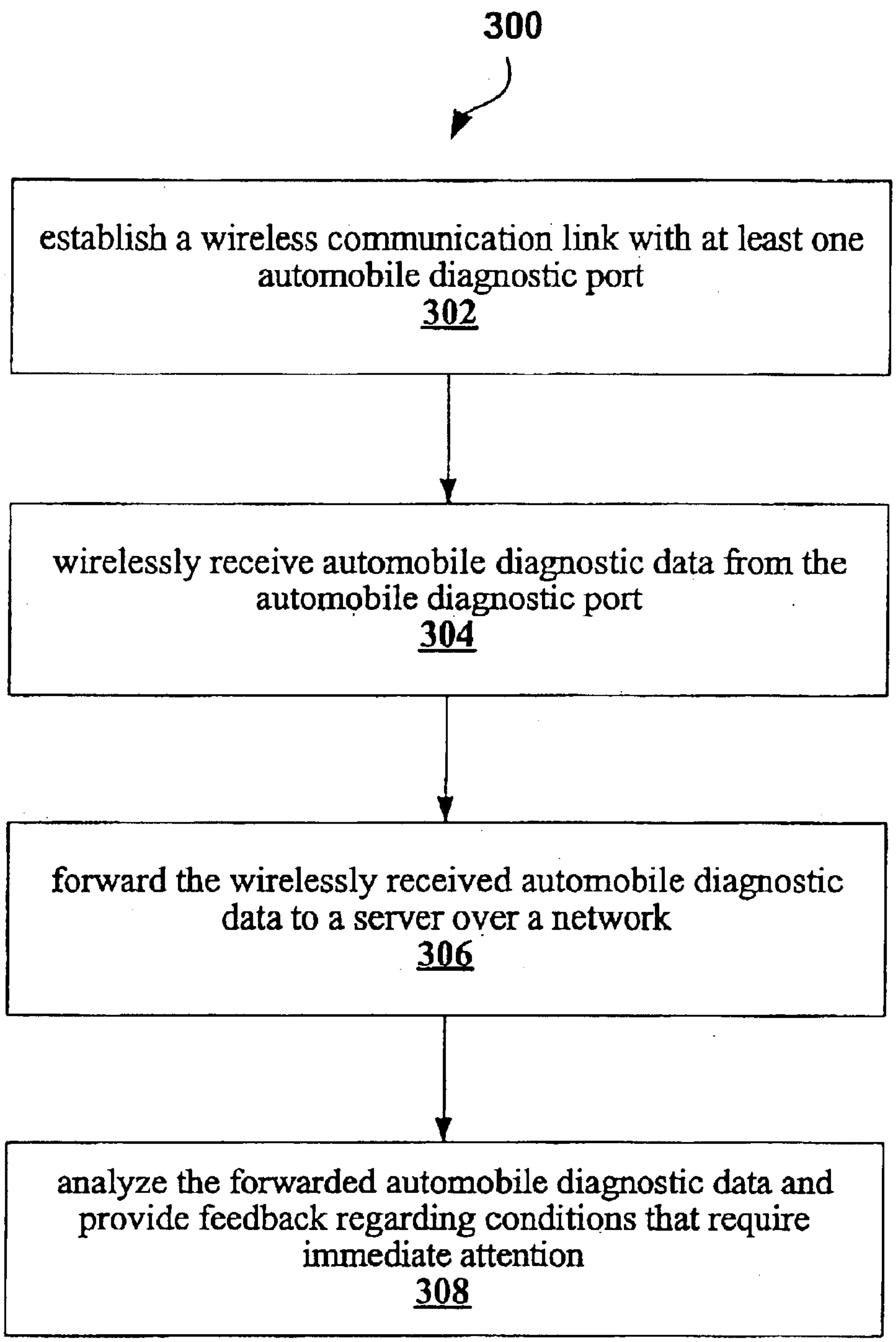
FIG. 3 illustrates a method associated with the present invention for forwarding automobile diagnostic data via a plurality of gateways dispersed at predetermined physical locations.

FIG. 3 illustrates method 300 associated with the present invention for forwarding automobile diagnostic data via a plurality of gateways dispersed at predetermined physical locations, wherein the method comprises the steps of: establishing a wireless communication link with at least one automobile diagnostic port 302, wirelessly receiving automobile diagnostic data from the automobile diagnostic port 304, wherein the automobile diagnostic data comprises a set of automobile diagnostic codes in conformity with a diagnostic standard; and forwarding the wirelessly received automobile diagnostic data to a server over a network (such as a WAN, LAN, or the Internet) 306, wherein the server analyzes the forwarded automobile diagnostic data and provides feedback 308 regarding conditions that require immediate attention.

As mentioned above, the specific locations at which such analyzed data can be received should not be used to limit the scope of the present invention.

In the preferred embodiment, the wireless communication is implemented via an IEEE 802.11-based protocol (i.e., 802.11a, 802.11b, 802.11, or 802.11g). Additionally, the network analyzer server and the gateways are able to communicate via any of the following networks: LANs, WANs, or the Internet. Also, the preferred standard for the diagnosis of automobile diagnostic data is the ODB2 standard.

Figure 4:
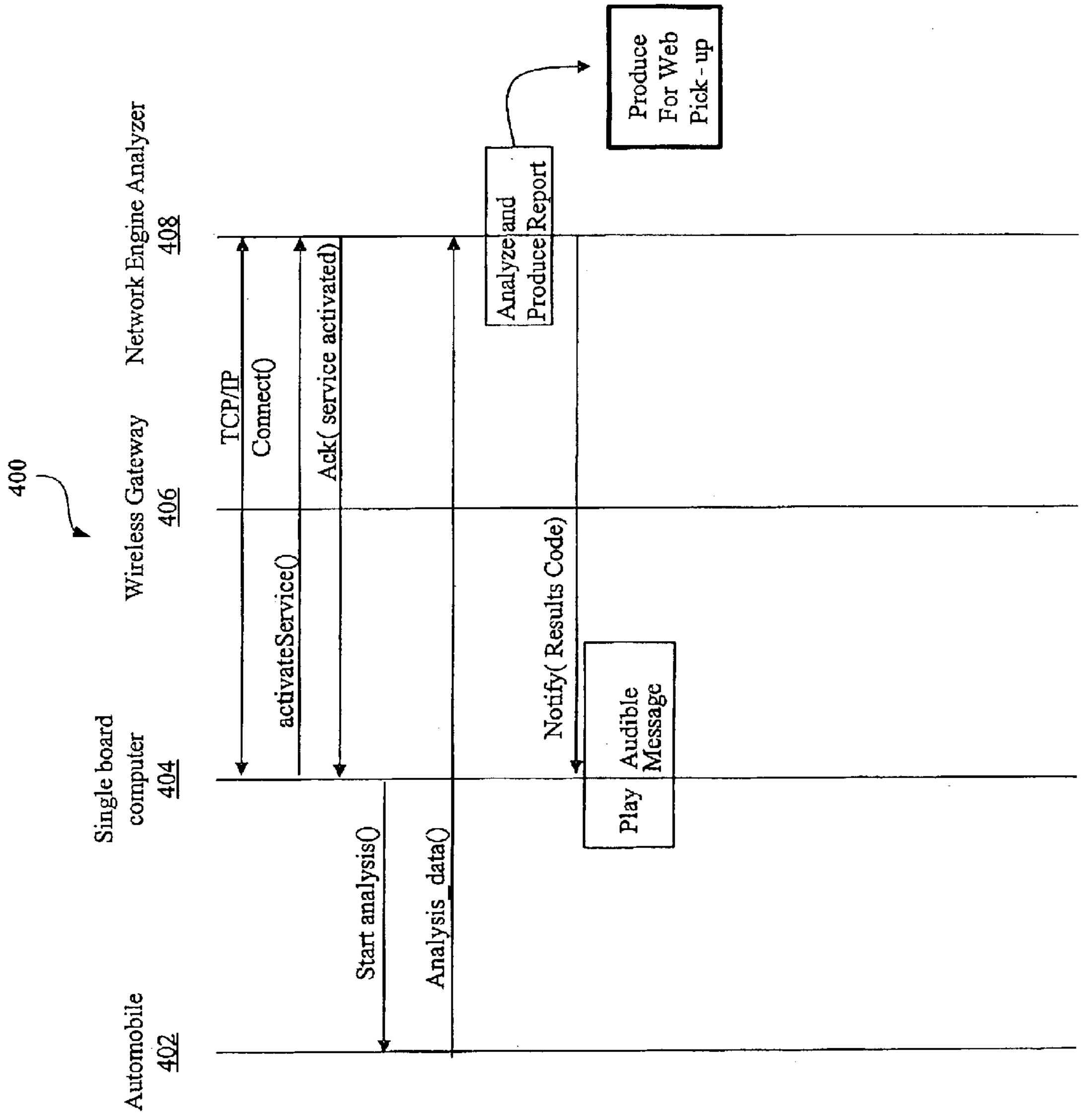
FIG. 4 illustrates a time-line diagram outlining the interactions between the automobile, the single board computer, the wireless gateway, and the network analyzer server.

FIG. 4 illustrates a time-line diagram 400 outlining the interactions between automobile 402, single board computer 404, wireless gateway 406, and network analyzer server 408. First, single board computer 404 establishes a communication session with network engine analyzer 408 via wireless gateway 406. Next, a set of messages are exchanged between the single board computer 404 and the network engine analyzer 408 regarding an acknowledgement for service activation. Upon reception of such an acknowledgement, automobile analysis is activated and the data for analysis is forwarded to the network engine analyzer 408. Lastly, network engine server 408 analyzes the forwarded data and produces a report for pick-up over a network such as the Internet. Optionally, an indication is rendered at the subscriber's end (e.g., an audible message is played in the automobile indicating the analyzed report is ready for pick-up over the Internet).

Conclusion

A system and method have been shown in the above embodiments for the effective implementation of a network car analyzer. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by type of wireless network, location for receiving analyzed data, software/program, computing environment, and/or specific hardware.

The above enhancements are implemented in various computing environments. For example, the present invention may be implemented on a conventional IBM PC or equivalent, multi-nodal system (e.g., LAN) or networking system (e.g., Internet, WWW, or wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of ODB compliant systems.

What is claimed is:

1. A method for retrieving and forwarding automobile diagnostic data via a plurality of gateways dispersed at predetermined physical locations, said method comprising the steps of:

a. establishing a wireless communication link with at least one automobile diagnostic port;

b. wirelessly receiving automobile diagnostic data from said automobile diagnostic port, said automobile diagnostic data comprising a set of automobile diagnostic codes in conformity with a diagnostic standard; and c. forwarding said wirelessly received automobile diagnostic data to a server over a network, said server analyzing said forwarded automobile diagnostic data and providing feedback regarding conditions that require immediate attention.

2. A method as per claim 1, wherein said diagnostic standard is the open basic diagnostic 2 (OBD2) standard.

3. A method as per claim 1, wherein said feedback is forwarded to any of the following preset locations: a personal computer associated with a user of said automobile or a computing device associated with a service station.

4. A method as per claim 1, wherein said wireless communications are via an IEEE 802.1 1b protocol.

5. A method as per claim 1, wherein said network is any of the following: local area network, wide area network, or the Internet.

6. A method for analyzing automobile diagnostic data, said method comprising the steps of:

a. receiving, over a network, automobile diagnostic data from a gateway located at a predefined location, said gateway wirelessly receiving said vehicle diagnostic data from an automobile;

b. analyzing said received automobile diagnostic data and identifying indications of malfunction; and c. forwarding said identified indications of malfunction to one or more subscriber-defined locations, wherein said identified indications of malfunction are utilized at said one or more subscriber-defined locations in the diagnosis of automobile related mal-functions.

7. A method as per claim 6, wherein said automobile diagnostic data comprises a series of diagnostic codes in conformity with a diagnostic standard.

8. A method as per claim 7, wherein said diagnostic standard is the open basic diagnostic 2 (OBD2) standard.

9. A method as per claim 6, wherein said wireless communications are via an IEEE 802.11b protocol.

10. A method as per claim 6, wherein said network is any of the following: local area network, wide area network, or the Internet.

11. A system offering one or more subscribers network based automobile diagnostic services, said system comprising:

a. a plurality of gateways dispersed at predetermined physical locations, each of said gateways capable of establishing a wireless communication link with at least one automobile diagnostic port for wirelessly receiving and forwarding automobile diagnostic data, said automobile diagnostic data comprising a set of automobile diagnostic codes in conformity with a diagnostic standard; and b. a network analyzer server capable of receiving said forwarded automobile diagnostic data, said server analyzing said forwarded automobile diagnostic data and providing feedback regarding conditions that require immediate attention.

12. A system as per claim 11, wherein said diagnostic standard is the open basic diagnostic 2 (OBD2) standard.

13. A system as per claim 11, wherein said wireless communications are via an IEEE 802.11b protocol.

14. A system as per claim 11, wherein said network is any of the following: local area network, wide area network, or the Internet.

15. A business method for generating revenue by offering a subscription-based diagnostic service analyzing automobile diagnostic data over a network, said automobile diagnostic data received over a plurality of gateways located at pre-defined locations, said method comprising the steps of:

a. receiving, over said network, automobile diagnostic data from one gateway in said plurality of gateways, said gateway wirelessly receiving said automobile diagnostic data from a subscriber's automobile;

b. analyzing said received automobile diagnostic data and identifying indications of malfunction in said subscriber's automobile;

c. forwarding said identified indications of malfunction to one or more subscriber-defined locations, wherein said identified indications of malfunction are utilized at said one or more subscriber-defined locations in the diagnosis of automobile related mal-functions; and d. charging said subscriber a fee for said diagnostic service.

16. A business method as per claim 15, wherein said received automobile diagnostic data is based upon the open basic diagnostic 2 (OBD2) standard.

17. A business method as per claim 15, wherein said wireless communications between said gateways and automobiles are via an IEEE 802.11b protocol.

18. A business method as per claim 15, wherein said network is any of the following: local area network, wide area network, or the Internet.

* * * * *